United States Patent Office 3,780,094
Patented Dec. 18, 1973

3,780,094
PREPARATION OF ESTERS OF AROMATIC ALCOHOLS
Jack L. Herz, Scarsdale, N.Y., assignor to Stauffer Chemical Company, New York, N.Y.
No Drawing. Filed May 15, 1969, Ser. No. 825,078
Int. Cl. C07c 67/00
U.S. Cl. 260—488 CD
16 Claims

ABSTRACT OF THE DISCLOSURE

A novel procedure is provided for synthesizing esters of aromatic alcohols by oxidizing an alkyl- or polyalkyl-aromatic hydrocarbon in the presence of a carboxylic acid anhydride, under controlled conditions. High conversions of the desired aromatic ester product are obtained and such product can be readily converted to the corresponding alcohol by hydrolysis. The ester products are used as organic intermediates in the preparation of the corresponding alcohols of known commercial utility. The esters are also useful in the preparation of perfumes and are excellent solvents in organic reactions.

FIELD OF THE INVENTION

This invention relates to a novel, simple and rapid procedure for preparing esters of aromatic alcohols by subjecting, to oxidizing conditions, an alkyl- or a polyalkylaromatic hydrocarbon in the presence of a carboxylic acid anhydride. The ester product is obtained in good yield at a relatively high conversion while minimizing the usual simultaneous production of the alkyl- or polyalkylaromatic acid by-product. The ester product can then be readily converted to the alcohol by a simple procedure such as, for example, hydrolysis.

DESCRIPTION OF THE PRIOR ART

U.S. Pat. 2,727,919 discloses a process for oxidizing polyalkylaromatic hydrocarbons or oxidizing esters of difficultly oxidizable alkylaromatic carboxylic acids to produce the corresponding aromatic carboxylic acid half esters by the addition of a small amount of an organic acid anhydride. The anhydride is used only to reduce the induction period of the oxidation. Amounts as low as 0.2% by weight of the aforesaid anhydride, based on the material oxidized, have been found to be sufficient and amounts in excess of 4% have not been found to significantly contribute to the operability of the process. A prolonged reaction period is nevertheless necessary and the illustrative examples require a period, in one instance of 25 hours and in the second instance 12 hours, to obtain the desired product, i.e., the aromatic/carboxylic acid. In a further example, the oxidation of methyl toluates also required a prolonged period, i.e., 21 hours.

Similarly, U.S. Pat. 3,045,045 discloses the preparation of aromatic acid anhydrides by liquid phase partial oxidation of alkylaromatic hydrocarbons. The alkylaromatic hydrocarbon is dissolved in an alkanoic acid anhydride and then treated with oxygen in the presence of a heavy metal oxidation catalyst. The alkanoic acid anhydride solvent is used in amounts varying between 5 to 20 parts by weight per part of alkyl aromatic compound. In the illustrative example, there is described the oxidation of a mixture of five parts of 2,6-dimethylnaphthalene, 50 parts of acetic anhydride solvent and 2.5 parts of cobaltous acetate. However, after a reaction period of 12 hours, the composition of the oxidation product was 50 to 60% unreacted alkyl naphthalene, 30–40% 6-methyl-2-naphthoic anhydride and 10% 6-methyl-2-naphthaldehyde.

In the present invention, as distinguished from the prior art discussed above, the oxidation is directed to the preparation of esters of aromatic alcohols and particularly, to the preparation of esters of benzyl alcohols while the aforementioned references are directed to the production of aromatic anhydrides and acids. Further, using the prior art procedures, alkyl groups containing 2 or more carbon atoms are cleaved to form the carboxylic acid while in the present process, the side chain remains intact.

SUMMARY OF THE INVENTION

In accordance with the process of the present invention, there is provided a simple procedure for the preparation of esters of aromatic alcohols by reacting an alkyl- or a polyalkylaromatic hydrocarbon in the presence of a carboxylic acid anhydride. Good yields at relatively high conversions of the desired aromatic ester are obtained in a very short period of time and the product can then be readily converted to the alcohol by hydrolysis.

The oxidation is conducted at temperatures ranging from room temperature up to a high temperature, in the presence of oxygen and in the presence of a substantial amount of a carboxylic acid anhydride. The reaction may be conducted under pressure and preferably, in the presence of an oxidation catalyst. An initiator and/or promoter may also be suitably included in the reaction mixture.

DETAILED DESCRIPTION OF THE INVENTION

The present invention relates to a novel and fairly simple procedure for preparing esters of aromatic alcohols by oxidizing an alkyl- or polyalkylaromatic hydrocarbon in the presence of a carboxylic acid anhydride. The reaction can be conducted in an extremely wide temperature range and at pressures up to about 250 p.s.i.g. Quite unexpectedly, using the present process, it has been found that good yields of the aromatic ester are obtained and the formation of such by-products as aromatic aldehydes and aromatic acids is minimized. The aromatic ester products thus obtained are easily convertible to the corresponding alcohol by a simple hydrolysis step.

Suitable alkyl- or polyalkylaromatic hydrocarbons include, for example, alkylbenzenes such as toluene, o-, m- and p-xylene, ethylbenzene, propylbenzene, mesitylene, tetramethylbenzenes including durene (1,2,4,5 - tetramethylbenzene), methylethylbenzene, as well as the halo- and nitro-substituted alkyl- or polyalkyl-aromatic hydrocarbons such as chlorotoluene, nitrotoluene, and the like; alkylated polynuclear aromatic compounds such as naphthalene including alkyl-substituted naphthalenes such as monoalkylnaphthalene, dialkylnaphthalene and trialkylnaphthalenes, and illustratively, 1-methylnaphthalene, 2-methylnaphthalene, 2,6 - dimethylnaphthalene, 2,3,6-trimethylnaphthalene, and the like; alkyl-substituted heterocyclic compounds such as alkylpyridines, alkylimidazoles, alkylacridines, and illustratively, 3 - methyl-pyridine, 4-(5)-methylimidazole, 3-methyl-pyrrolle, and the like.

Carboxylic acid anhydrides which may be used in the present process include acid anhydrides containing up to 22 carbon atoms such as, for example, acetic anhydride, propionic anhydride, butyric anhydride, benzoic anhydride and the like; anhydrides of dibasic acids and cyclic carboxylic acid anhydrides such as, for example, maleic anhydride, succinic anhydride, adipic anhydride, phthalic anhydride, tetrahydrophthalic anhydride, and the like.

The composition of the reactants that is, the alkyl- or polyalkylaromatic hydrocarbon and carboxylic acid anhydride can vary from about 15 to about 95% anhydride and 5 to 85% alkyl- or polyalkylaromatic hydrocarbon but generally about 50% of the anhydride is used in order to secure good results.

Although lower temperatures will effect oxidation that is, temperatures as low as about 20° C., a higher temperature range is usually employed ranging between about 100° and 190° C. Temperatures as high as 300° C. can also be suitably used in the present process.

The oxidation reaction is conducted in the presence of oxygen or oxygen-containing gases such as a mixture of oxygen with inert gases i.e., nitrogen, carbon dioxide, etc. Suitably, a composition containing about 20% oxygen and about 80% nitrogen can be used.

The reaction is generally maintained under pressure and the usual gas pressure varies from about 25 to about 250 p.s.i.g. depending upon the temperature used. It has been found however, that the pressure must be sufficient in order to keep the alkylaromatic hydrocarbon in the liquid phase.

While the oxidation can be conducted in the absence of a catalyst, the oxidation rate is substantially increased when a catalyst is used. Suitable catalyst are metal oxides, metal salts, and the like, and illustrative catalysts are cobalt, manganese, palladium, copper, uranium, lead, and the like; salts of aliphatic acids such as acetic, propionic, naphthenic, butyric acids, and the like; salts of aromatic acids such as, for example, benzoic, toluic, naphthalene carboxylic acids, and the like. The catalyst usually employed are compounds of cobalt and manganese. The concentration of the catalyst can vary from about 0.005% up to about 5% based upon the alkyl- or polyalkylaromatic stock charge.

It has also been found that the reaction is facilitated in the presence of a free radical initiator that is, an organic compound which readily decomposes into free radical fragments and illustratively, azodicyclohexanecarbonitrile, azo - bis - isobutyronitrile, benzoylperoxide, alkylperoxides and hydroperoxides such as t-butylhydroperoxide, cyclohexylperoxide, and the like. The amount of initiator used can vary from about 0.001 to 3% and suitably a range of about 0.1 to 0.5% is employed.

Similarly, advantageous results are obtained, i.e., more rapid reaction at lower temperatures, when promoters are included in the reaction mixture. Suitable promoters are, for example, hydrogen bromide, alkaline and alkaline earth metal bromides such as sodium bromide, potassium bromide, calcium bromide, magnesium bromide, and the like; alkyl and acyl bromides containing up to 22 carbon atoms such as methyl bromide, acetyl bromide, n-propyl bromide, octadecyl bromide, caprylic bromide, stearyl bromide, and the like. The promoter can be included in the reaction mixture in amounts varying between about 0.01 and 5% and suitably from about 0.1 to 2%.

The reaction time varies between about 0.5 and about 8 hours but the reaction is usually completed within about 1 to 5 hours depending of course, upon the reaction temperature as well as the pressure.

The advantages of the present process are quite clear as it is possible to easily synthesize an alkylaromatic ester such as, for example, benzylacetate (which is readily convertible to benzyl-alcohol by hydrolysis), in good yields at relatively high conversions and within a relatively short period of time.

Using the present process, an alkylbenzene such as toluene can be oxidized to benzyl acetate; similarly using other alkylaromatic or polyalkylaromatic compounds, the corresponding esters are obtained. Thus o-methylbenzyl acetate may be synthesized from o-xylene, α-phenethyl acetate may be synthesized from ethylbenzene; 3,5-dimethylbenzyl acetate may be synthesized from mesitylene; p - chlorobenzyl acetate may be synthesized from p-chlorotoluene; m-nitrobenzyl acetate may be prepared from m-nitrotoluene; 6-methyl-2-acetoxymethylnaphthalene may be prepared from 2,6-dimethylnaphthalene, etc. The corresponding alcohols are readily available by the hydrolysis of these esters.

If toluene is oxidized in propionic anhydride, benzyl propionate is formed; when mixtures of toluene and butyric anhydride are oxidized, benzyl butyrate is formed. Other anhydrides which can be used to produce the corresponding esters are pentanoic anhydride, hexanoic anhydride, succinic anhydride, maleic anhydride, glutaric anhydride, pimelic anhydride, benzoic anhydride, toluic anhydride, and the like.

The yield of ester may be increased by hydrogenating the crude reaction mixture with a hydrogenation catalyst, i.e., a noble metal catalyst such as platinum, palladium, rhodium, ruthenium, iridium or a Raney nickel catalyst. The aldehydes which are formed as by-products are reduced to the corresponding benzyl alcohol. In the presence of acetic anhydride, or another suitable carboxylic acid anhydride, these alcohols are rapidly converted to the corresponding benzyl esters.

In general, the oxidation of an alkyl aromatic or a substituted alkyl aromatic in the presence of substantial amounts of a carboxylic acid anhydride will produce the α-substituted ester of the corresponding carboxylic acid. In the case of cyclic anhydrides (such as, for example succinic anhydride), the product will be the α-substituted half ester of the corresponding anhydride, as illustrated by the following reaction scheme:

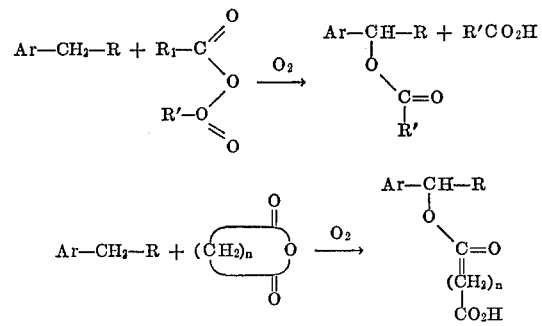

In the above equations Ar—CH₂—R designates an alkyl aromatic hydrocarbon.

The following examples detail the nature of the present invention and are therefore to be considered as illustrative but not limiting the invention.

EXAMPLE I

Into a stainless steel autoclave was charged 1200 ml. of toluene containing 2 g. of cobalt acetate. The autoclave was pressurized to 150 p.s.i.g. with air, and the temperature taken up to 150° C. While stirring vigorously, fresh air was admitted and spent gases were removed at a rate of 2 liters/min. The reaction was thus maintained for 1.5 hr. The mixture was then rapidly cooled to room temperature. The material obtained contained 14% benzoic acid, 2% benzyl alcohol, and 2% benzaldehyde.

Thus, it can be seen that in the absence of acetic anhydride, a relatively small amount of benzyl alcohol and benzaldehyde were present in the oxidation product. Further oxidation resulted in more benzoic acid being formed but the concentration of alcohol and aldehyde remained relatively constant.

EXAMPLE II

Into a stainless autoclave was charged 1200 ml. of a 50 weight percent solution of toluene in acetic anhydride. A cobalt naphthenate catalyst was added. The cobalt naphthenate concentration was 0.50%. The autoclave was pressurized to 150 p.s.i.g. with air, and the reactants were heated to 150° C. The reaction mixture was vigorously stirred while air was admitted to the system at the rate of 2 liters/min.; the spent reaction gases were also continuously removed. After 1.5 hr. under these conditions, the reactants were rapidly quenched to room temperature. The conversion of toluene to benzyl acetate was 5.1%, while 1.6% of the toluene was converted to benzaldehyde. No benzoic acid or benzoic acid derivatives were obtained.

EXAMPLE III

Into a stainless steel autoclave was charged 1200 ml. of a 50 weight percent solution of toluene in acetic anhydride. The solution contained 4% cobalt naphthenate catalyst. The autoclave was pressurized to 150 p.s.i.g. with air, and was heated to 150° C. Air was added to the system and spent reaction gases were moved from the system at a rate of 2 liters/min. The reaction mixture was vigorously stirred. After a ½ hour initiation period at 150° C., the reactants were rapidly cooled to 120°–125° C., and all other reaction conditions were maintained for an additional 5 hours. The conversion of toluene to benzaldehyde was 2.8%, the conversion to benzoic acid was 2.5%, while the conversion to benzyl acetate was 7.8%.

EXAMPLE IV

Following the procedure described in Example III supra, except for the use of p-chlorotoluene and acetic anhydride, there was obtained a good yield of p-chlorobenzyl acetate. Similarly, following the procedure of Example III supra, and using the indicated carboxylic acid anhydrides and alkylaromatic hydrocarbons, the corresponding aromatic esters are obtained in good yield:

| Carboxylic acid anhydride | Alkylaromatic hydrocarbon | Aromatic ester |
|---|---|---|
| Propionic | Toluene | Benzyl propionate. |
| Phthalic | do | Benzyl hydrogenphthalate. |
| Maleic | do | Benzyl hydrogenmaleate. |
| Butyric | o-Xylene | o-Methylbenzyl butyrate. |
| Acetic | 2-methylnaphthalene | 2-acetoxymethylnaphthalene. |
| Do | 4-chlorotoluene | 4-chlorobenzyl acetate. |
| Lauric | Ethylbenzene | α-Phenethyl laurate. |
| Acetic | Nonylbenzene | Phenyloctylcarbinyl acetate. |

EXAMPLE V

Into a stainless steel autoclave designed for continuous operation on a 1 liter volume was added 1 liter of a stock solution of 4% cobalt naphthenate in a 50 weight percent mixture of toluene and acetic anhydride. The autoclave was pressurized to 150 p.s.i.g. with air, and the reactants were heated to 150° C. Air was added to the system and spent reaction gases were removed from the system at the rate of 500 cc./min. The reaction mixture was vigorously stirred. After an initiation period of ½ hr., stock solution was added continuously (and reaction product was removed continuously at the rate of 10 ml./min.). All other reaction parameters were kept constant. After operating under these conditions for 4.5 hrs., a steady state was achieved, and the composition of product leaving the autoclave remained unchanged. Under steady state conditions, 5.3% of the toluene was converted to benzyl acetate and 2.1% of the toluene was converted to benzaldehyde. No benzoic acid or benzoic acid derivatives were obtained.

EXAMPLE VI

Into a stainless steel autoclave was charged 1200 ml. of a 50 weight percent solution of o-xylene containing 1% cobalt naphthenate. The autoclave was pressurized to 150 p.s.i.g. with air and was heated at 150° C. Air was admitted to the system at a rate of 2 liters/min., and the reaction was vigorously stirred. After 0.75 hr. under these conditions, the reactants were rapidly cooled to room temperature. The conversion of toluene to products was 12–14%. Of the toluene converted to product, 2.5% could be accounted for as o-tolualdehyde, 8.4% was converted to o-methylbenzyl acetate, 0.5% was converted to phthalic anhydride, and 0.8% was converted to phthalide. No toluic acid was found.

EXAMPLE VII

The same stock solution that was used in Example VI was oxidized under exactly the same conditions; however the reaction was carried out at 150° C. for 1.75 hr. The conversion of o-xylene was 22%–27%. Of the xylene converted, 15% was converted to o-methylbenzyl acetate, 3% was accounted for as o-tolualdehyde, 3% was converted to phthalide, and 1.5% was converted to phthalic anhydride. No o-toluic acid was obtained.

EXAMPLE VIII

The same reaction conditions were employed for the oxidation of a 50 weight percent solution of ethylbenzene in acetic anhydride as described in Example VI. The concentration of cobalt naphthenate catalyst was 1.25%. After 1 hr. at 150° C. and a pressure of 150 p.s.i.g., the conversion of ethylbenzene to oxidation products was 40%. The conversion to α-methylbenzyl acetate, acetophenone, and benzaldehyde was 19%, 19% and 1.6% respectively.

EXAMPLE IX

Ethylbenzene was oxidized in the presence of acetic anhydride under the same conditions as Example VIII; however the reaction mixture was held at 150° C. for 2 hr. The conversion of ethylbenzene was 70%. Of the ethylbenzene reacted, 24% was converted to α-methylbenzyl acetate, 24% was converted to acetophenone, 21% was converted to benzoic acid, and 1% was converted to benzaldehyde.

EXAMPLE X

The procedure of Example II supra is repeated except that 1% by weight of potassium bromide is added to the reaction mixture. The reaction time is significantly reduced by the addition of the potassium bromide promoter and the major oxidation product is benzylacetate.

EXAMPLE XI

Into a stainless steel autoclave is charged 1200 ml. of a 50 weight percent solution of toluene in acetic anhydride. To this is added 5 g. azodicyclohexanecarbonitrile. The autoclave is heated up to 150° C. and pressurized to 150 p.s.i.g. Air is continuously blown through the vigorously stirred system. After 1 hour, the reaction is quenched to 100° and 0.005% cobalt acetate is added to decompose any peroxides present. The major product is benzylacetate.

The invention has been described with respect to certain preferred embodiments and various modifications and variations thereof will become obvious to persons skilled in the art. It is therefore to be understood that such modifications and variations are to be included within the spirit and scope of this invention.

I claim:
1. A process for the preparation of an aromatic ester which comprises oxidizing an alkyl- or polyalkyl aromatic hydrocarbon in the liquid phase in the presence of oxygen or oxygen in admixture with other inert gases, cobalt naphthenate catalyst and acetic anhydride for a reaction time in the range of from about 0.5 to about 8 hours at 20°–300° C.
2. A process according to claim 1 wherein the oxidation is conducted at a temperature between about 100° and 190° C.
3. A process according to claim 1 wherein the reaction is conducted under pressures between about 25 and 250 p.s.i.g.
4. A process according to claim 1 wherein the alkylaromatic hydrocarbon is an alkylbenzene.
5. A process according to claim 4 wherein the alkylbenzene is toluene.
6. A process according to claim 1 wherein the catalyst is used in a range of about 0.005 to about 5% based on the alkyl- or polyalkylaromatic hydrocarbon.
7. A process according to claim 1 wherein the ratio of acetic anhydride to the alkyl- or polyalkylaromatic hydrocarbon is about 15 to about 95%.
8. A process according to claim 7 wherein acetic anhydride is present in an amount of about 50%, based on the alkyl- or polyalkylaromatic hydrocarbon.

9. A process according to claim 1 wherein the crude reaction mixture resulting from said oxidation is hydrogenated in the presence of a hydrogenation catalyst selected from the group consisting of Group VIII noble metals and Raney nickel.

10. A process according to claim 9 wherein the hydrogenation catalyst is Raney nickel.

11. A process according to claim 1 wherein benzylacetate is obtained by oxidizing toluene in the presence of acetic anhydride and cobalt naphthenate.

12. A process according to claim 1 wherein the oxidation is conducted in the presence of a free radical initiator.

13. A process according to claim 1 wherein the oxidation is conducted in the presence of a promoter selected from the group consisting of hydrogen bromide, sodium bromide, potassium bromide and calcium bromide.

14. A process according to claim 1 wherein said reaction time is within the range of from about 1 to about 5 hours.

15. A process according to claim 1 wherein said oxygen in admixture with other gases is air.

16. A process according to claim 1 wherein said oxygen in admixture with other gases is a composition containing about 20% oxygen and 80% nitrogen.

References Cited

UNITED STATES PATENTS

| | | | |
|---|---|---|---|
| 3,045,045 | 7/1962 | Melchiore | 260— 546 |
| 3,047,616 | 7/1962 | Blair et al. | 260—488 |
| 3,162,683 | 12/1964 | Jones et al. | 260—488 |
| 3,649,675 | 3/1972 | Koehl | 260—488 CD |
| 3,652,668 | 3/1972 | Bryce-Smith et al. | 260—488 CD |
| 3,665,030 | 5/1972 | D'Ostrowick et al. | 260—488 CD |

VIVIAN GARNER, Primary Examiner

U.S. Cl. X.R.

260—279 R, 295 R, 309, 326.3, 346.4, 410.5, 468 R, 475 N, 476 R, 485 L, 524 R, 592, 599, 621 G

PO-1050
(5/69)

UNITED STATES PATENT OFFICE
CERTIFICATE OF CORRECTION

Patent No. 3,780,094  Dated December 18, 1973

Inventor(s) Jack L. Herz

It is certified that error appears in the above-identified patent and that said Letters Patent are hereby corrected as shown below:

In the specification, Column 4, line 25, in the formula "Ar—$CH_2$—R + $R_1$" should read -- Ar—$CH_2$—R + R' --

In Example III, Column 5, line 7, "moved" should read -- removed --.

Claim 7 should be rewritten as follows:

-- Claim 7. A process according to claim 1 wherein the ratio of acetic anhydride to the alkyl- or polyalkylaromatic hydrocarbon is from about 15 to about 95% anhydride and 5 to 85% alkyl- or polyalkylaromatic hydrocarbon. --

Signed and sealed this 13th day of August 1974.

(SEAL)
Attest:

McCOY M. GIBSON, JR.          C. MARSHALL DANN
Attesting Officer              Commissioner of Patents